(12) United States Patent
Ogo et al.

(10) Patent No.: US 6,533,428 B1
(45) Date of Patent: Mar. 18, 2003

(54) FLAT-SURFACE TYPE DISPLAY DEVICE

(75) Inventors: Ikuo Ogo, Kumamoto (JP); Shigeru Yachi, Kumamoto (JP); Yoshihide Nishida, Kumamoto (JP); Atsushi Ito, Kumamoto (JP); Toshiyuki Yoneda, Tokyo (JP)

(73) Assignees: Kabushiki Kaisha Advanced Display, Kumamoto (JP); Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/759,366

(22) Filed: Jan. 16, 2001

(30) Foreign Application Priority Data

Jan. 19, 2000 (JP) ........................................ 2000-009716

(51) Int. Cl.$^7$ ................................................. F21V 7/04
(52) U.S. Cl. ............................. 362/31; 362/26; 362/27; 349/65; 349/58; 349/150
(58) Field of Search ............................. 362/31, 27, 26; 349/65, 58, 150

(56) References Cited

U.S. PATENT DOCUMENTS

| 5,046,826 | A | * | 9/1991 | Iwamoto et al. | 349/62 |
| 5,142,453 | A | * | 8/1992 | Ohta et al. | 116/288 |
| 5,150,960 | A | * | 9/1992 | Redick | 362/31 |
| 5,664,861 | A | * | 9/1997 | Asada et al. | 362/27 |
| 5,810,464 | A | * | 9/1998 | Ishikawa et al. | 349/65 |
| 6,079,838 | A | * | 6/2000 | Parker et al. | 362/26 |
| 6,152,569 | A | * | 11/2000 | Aizawa | 362/27 |

FOREIGN PATENT DOCUMENTS

| JP | 63-208001 | 8/1988 |
| JP | 6-36001 | 5/1994 |
| JP | 8-292325 | 11/1996 |
| JP | 10-73820 | 3/1998 |
| JP | 10-333141 | 12/1998 |

* cited by examiner

*Primary Examiner*—Sandra O'Shea
*Assistant Examiner*—Mark Tsidulko
(74) *Attorney, Agent, or Firm*—McDermott, Will & Emery

(57) ABSTRACT

A thin flat-surface type display device having a transmissive display panel is provided, which is capable of securing a space of an essential electric circuit for driving the display device without deteriorating an optical performance (luminance and uniformity thereof) of a surface light source device of an edge light system employed as a backlight. A light guide plate forming the surface light source device of the edge light system has a flat light emitting surface, and a back surface arranged so as to include (1) an inclined flat surface portion where a thickness of the light guide plate decreases linearly from a light-incident portion on which light emitted from a linear light source is incident toward a light-anti-incident portion, and (2) a parallel flat surface portion which is parallel with the light emitting surface in the vicinity of the light-anti-incident portion. Also, the two adjacent surfaces are connected to each other at an interface portion with an interface curved surface such that makes the two adjacent surfaces tangential. In addition, reflection dots are formed at the back surface side of the light guide plate in a predetermined shape at a predetermined density.

16 Claims, 6 Drawing Sheets

PRIOR ART

PRIOR ART

PRIOR ART

PRIOR ART

FLAT-SURFACE TYPE DISPLAY DEVICE

BACKGROUND OF THE INVENTION

1. Field of the Invention

The present invention relates to a flat-surface type display device having a transmissive display panel.

2. Description of Relevant Art

A conventional surface light source device used as a backlight of a flat-surface type display device having a transmissive display panel is classified into two systems depending on the position of the light source: a direct under-light system and an edge light system. In general, the direct under-light system is chiefly adopted in a large-scale display device that requires luminance, such as a monitor or an advertising tower, whereas the edge light system is chiefly adopted in a display device that requires thinness and lightness, such as a display device of a personal computer (hereinafter, abbreviated to PC). In particular, in case of notebook PCs with which the portability is of importance, the surface light source device of the edge light system is employed in almost all the products equipped with transmissive display panels.

The surface light source device of the edge light system is classified into a one-side type and a two-side type depending on the position of the linear light source. However, the basic arrangement is substantially the same in both except for the shape of a light guide plate and the total number of the linear light sources, etc. FIG. 7 is a view showing a cross section of a conventional surface light source device of a one-light-at-one-side (one-light-at-long-side) type. In the drawing, Numeral 1 denotes a linear light source composed of a cold cathode fluorescent tube or the like; Numeral 2 denotes a reflector that is provided to surround the linear light source 1 so as to reflect light emitted from the linear light source 1 in one direction; Numeral 3 denotes a rectangular light guide plate to which the reflector 2 surrounding the linear light source 1 is attached at one edge and on which light emitted from the linear light source 1 and reflected by the reflector 2 in one direction is incident; Numeral 4 denotes a reflection sheet placed at the back surface side of the light guide plate 3; Numeral 5 denotes an optical sheet placed at the main surface (light emitting surface) side of the light guide plate 3; and Numeral 11 denotes reflection dots formed on the back surface of the light guide plate 3.

The reflector 2 is made of a film of resin, such as PET, on which a metal layer or a metal reflection film is formed.

The light guide plate 3 is formed by making transparent resin, such as acrylic, into a desired shape by means of machining or injection molding, and then polishing the surface as the necessity arises. Light incident on the light guide plate 3 propagates throughout the same while repeating total reflections and reaches the opposing edge. The incident light is reflected irregularly by the reflection dots 11 formed on the back surface of the light guide plate 3 on the way to the opposing edge. Thus, a part of the light comes out from the main surface of the light guide plate 3, and the rest is reflected again by an interface between the main surface of the light guide plate 3 and an external (air) and directed to the back surface of the light guide plate 3. The light directed to the back surface of the light guide plate 3 is reflected by the reflection sheet 4 placed thereon. Thus, a part of the light goes into the light guide plate 3 again and comes out from the main surface of the light guide plate 3, and the rest propagates throughout the light guide plate 3 again, repeats the same process, and comes out from the main surface of the light guide plate 3.

The reflection dots 11 are formed on the back surface of the light guide plate 3 by means of printing using white ink having high reflectance, frosting finish, hot plating or injection molding. The density of the formed dots increases with distance from the light source, so that a uniform luminance distribution is achieved on the main surface of the light guide plate 3 by compensating a quantity of out-going light that decreases with distance from the linear light source 1.

Generally, a white or opalescent resin film or a resin film having thereon vapor-deposited a metal thin film is used as the reflection sheet 4.

The optical sheet 5 is formed by combining a plurality of opalescent resin films called as diffusion sheets and resin lens films (lens sheets) provided with a great many triangular prisms and thereby having a light collecting property. Typically, the optical sheet 5 has a structure, in which the lens film is sandwiched between the diffusion sheets. The optical sheet 5 increases luminance at a desired viewing angle by enhancing uniformity and directivity of light that comes out from the main surface of the light guide plate 3.

Factors that determine the performance (luminance and uniformity thereof) of the surface light source device of the edge light system include (1) propagation efficiency of light that goes into the light guide plate 3 and propagates throughout the same, and (2) incidence efficiency of light that is emitted from the linear light source 1 and incident on the light guide plate 3. As to the propagation efficiency throughout the light guide plate 3, as shown in FIG. 7, better efficiency is achieved when the light guide plate 3 has a rectangular cross section, and light under the total reflection condition propagates while repeating total reflections unless it is reflected irregularly by the reflection dots 11 and reaches the edge opposing the linear light source 1. Also, the incidence efficiency of light that is emitted from the linear light source 1 and incident on the light guide plate 3 depends on the thickness of a light-incident portion of the light guide plate 3 and the diameter of the linear light source 1. As is shown in FIG. 8, the efficiency is improved as the thickness of the light-incident portion of the light guide plate 3 increases in comparison with the diameter of the linear light source 1.

However, in a product employing the surface light source device of the edge light system as the backlight, because the weight, shape, etc. of the product are limited, it is impossible to design the product by giving the priority on the optical performance over the rest. More specifically, in case of a notebook PC adopting a flat-surface type display device having a transmissive liquid crystal panel, there has been an increasing need to produce a compact, light, and extremely thin display device to meet the demands of a compact, light notebook PC. Under these circumstances, with the display device that needs a liquid crystal panel and a backlight as well as an electric circuit for driving the liquid crystal panel on a signal supplied from an external device, it is becoming increasingly necessary to reduce the thickness of the product to the extent that the optical performance as the backlight will not be impaired.

FIG. 9 shows a typical conventional liquid crystal display device having a transmissive liquid crystal panel produced with an object to reduce the thickness of the product without impairing the optical performance of the backlight. In the drawing, Numeral 1 denotes a linear light source; Numeral 2 denotes a reflector; Numeral 3 denotes a light guide plate having a wedge-shaped cross section; Numeral 4 denotes a reflection sheet; Numeral 5 denotes an optical sheet; Numeral 6 denotes a transmissive display panel (liquid crystal panel, herein); Numeral 7 denotes a circuit board; Numeral 8 denotes a tape carrier package (hereinafter, abbreviated to TCP) composed of an elastic wiring board used in electrically connecting the liquid crystal panel 6 and circuit board 7 and driving ICs formed thereon; Numeral 9 denotes a mechanism component (mold frame); and Numeral 10 denotes a front frame. In the display device shown in FIG. 9, the thickness at the light-incident portion is secured by shaping the cross section of the light guide plate 3 into a wedge, on the other hand, the circuit board 7 is placed at the opposing side to the light-incident portion where the light guide plate 3 is less thick, whereby the overall thickness of the display device as a module is reduced.

In addition, in order to downsize the display device, a typical conventional liquid crystal panel is arranged as shown in FIG. 10. That is, it is arranged in such a manner that a signal necessary to drive the liquid crystal panel is supplied through the driving ICs mounted on the elastic TCP 8 by connecting the liquid crystal panel to the circuit board 7 having provided thereon a signal line, a power circuit, and a circuit for converting an external signal into a signal for the ICs. When installed in the display device, the TCP 8 is bent and the circuit board 7 is placed at the back surface side of the liquid crystal panel 6, thereby reducing the size (flat area) of the display device as a module. In FIG. 10, Numeral 12 denotes a backlight unit.

In addition, when the cross section of the light guide plate 3 is shaped into a wedge, an angle of incidence decreases each time light incident on the light guide plate 3 repeats reflections, and a ratio of light fluxes that no longer satisfy the total reflection condition increases at a remote portion from the light-incident portion, which results in a drawback that the propagation efficiency of light is undesirably reduced. However, by adjusting the density and size of the reflection dots 11 formed on the back surface of the light guide plate 3, deterioration in luminance uniformity can be prevented.

The conventional flat-surface type display device having a transmissive display panel is arranged as discussed above, and in order to reduce the thickness of the display device, the wedge-shaped light guide plate 3 that can reduce the thickness of the display device without deteriorating the optical performance of the backlight has been used extensively. However, in case that the display device is designed to have the uniform thickness entirely, as shown in FIG. 9, spaces at the components mounting positions on the circuit board placed at the opposite side to the light-incident portion have to be limited in height as the positions approximate to the light-incident portion side from the opposing side. For this reason, as shown in FIG. 11, the height of the mounted component is conventionally limited in each area, so that the components on the circuit board 7 do not interfere with the light guide plate 3. In FIG. 11, no via-hole is allowed at area A of the circuit board 7. At area B the component mountable height is 2 mm(max.), at area C the component mountable height is 1.8 mm(max.), and at area D the component mountable height is 1.2 mm(max.). However, the foregoing limitation raises a problem that the circuit design is complex and the resulting design is not electrically optimal. Further, there is also a mechanical limitation with respect to the design position of large-scale components, such as a connector. Thus, the foregoing limitations pose a serious problem in designing the entire display device.

In addition, in order to reduce the thickness and enhance the optical performance of the surface light source device of the edge light system, Japanese Laid-open Patent Application Nos. 208001/1988, 333141/1998, and 73820/1998, Japanese Laid-open Utility Application No. 36001/1994, Japanese Laid-open Patent Application No. 292325/1996, etc. propose to provide a curved surface having a certain curvature, a parabolic surface, a two-stage tapered surface, etc. at the back surface side of the light guide plate. However, when the above-proposed surface light source device of the edge light system is installed in the display device as the backlight, a sufficient space cannot be secured to form the electric circuit, thereby posing a problem that the thickness of the display device cannot be reduced. Further, in regard to the cross section of the light guide plate, if an angle a formed between the light-incident surface of the light-incident portion and the back surface decreases, so does the probability the light fluxes immediately after the incidence on the light guide plate will reflect totally, which results in a problem of lower light utilization, or occurrence of an unwanted bright line or dark line in the vicinity of the light-incident portion. Also, in case of the method of providing the two-stage tapered surface at the back surface side of the light guide plate, the reflection condition of the light that propagates throughout the light guide plate changes drastically at the connected portion of the tapers. Thus, there arises a problem that maintaining the luminance uniformity at the connected portion is quite difficult. Although such inconveniences can be improved to some extent by adjusting the reflection dots on the light guide plate, still it is impossible to adapt the resulting display device to a large-scale high-quality product.

SUMMARY OF THE INVENTION

The present invention is devised to solve the above problems, and therefore, has an object to obtain a thin flat-surface type display device having a transmissive display panel, which can secure a space of an essential electric circuit for driving the display device without deteriorating the optical performance (luminance and uniformity thereof) of a surface light source device of an edge light system used as a backlight.

A flat-surface type display device of the present invention is a flat-surface type display device furnished with: a transmissive display panel; a surface light source device of an edge light system for emitting light to the display panel from behind; a circuit board, connected to the display panel through a wiring board, for supplying the display panel with a signal necessary to drive the display panel; and a mechanical portion for housing and retaining the display panel, surface light source device, and circuit board, in which the surface light source device of the edge light system is formed by a light guide plate having a flat light emitting surface, and a back surface side opposing the light emitting surface and arranged so as to include (1) an inclined flat surface portion where a thickness of the light guide plate decreases linearly from a light-incident portion on which light emitted from a light source is incident toward a light-anti-incident portion at an opposing side, and (2) a flat surface portion that is parallel with the light emitting surface in a vicinity of the light-anti-incident portion with the thickness of the light guide plate being reduced from the thickness of the light guide plate in the light incident portion, and the circuit board is mounted in the vicinity of the light-anti-incident portion at the back surface side of the light guide plate, which is an area where a back surface of the light guide plate is the flat surface portion.

Also, the surface light source device of the edge light system is formed by a light guide plate having a flat light emitting surface, and a back surface side opposing the light emitting surface and arranged so as to include (1) a first inclined flat surface portion where a thickness of the light guide plate decreases linearly from a light-incident portion on which light emitted from a light source is incident toward a light-anti-incident portion, and (2) a second inclined flat surface portion, following the first inclined flat surface portion, given with a smaller angle of inclination than an angle of inclination of the first inclined flat surface portion in a vicinity of the light-anti-incident portion, and the circuit board is mounted in the vicinity of the light-anti-incident portion at the back surface side of the light guide plate, which is an area where a back surface of the light guide plate is the second inclined flat surface portion.

In addition, an area parallel with the light emitting surface is additionally provided in a vicinity of the light-incident portion at the back surface side of the light guide plate.

Further, the surface light source device of the edge light system is formed by a light guide plate having a flat light emitting surface, and a back surface side opposing the light emitting surface and arranged so as to include (1) a first flat surface portion parallel with the light emitting surface in a vicinity of a light-incident portion on which light emitted from a light source is incident, (2) a curved surface portion, following the first flat surface portion, where a thickness of the light guide plate decreases in an at least third-order curved line toward a light-anti-incident portion, and (3) a second flat surface portion, following the curved surface portion, which is parallel with the light emitting surface in a vicinity of the light-anti-incident portion with the thickness of the light guide plate being reduced from the thickness of the light guide plate in the first flat surface portion, and the circuit board is mounted in the vicinity of the light-anti-incident portion at the back surface side of the light guide plate, which is an area where a back surface of the light guide plate is the second flat surface portion.

Furthermore, the surface light source device of the edge light system is formed by a light guide plate having a flat light emitting surface, and a back surface side opposing the light emitting surface and arranged so as to include (1) a flat surface portion parallel with the light emitting surface in a vicinity of a light-incident portion on which light emitted from a light source is incident, (2) a first curved surface portion, following the flat surface portion, where a thickness of the light guide plate decreases in an at least third-order curved line toward a light-anti-incident portion, and (3) a second curved surface portion, following the first curved surface portion, given with a smaller rate of change than a rate of change of the first curved surface portion in a vicinity of the light-anti-incident portion, and the circuit board is mounted in the vicinity of the light-anti-incident portion at the back surface side of the light guide plate, which is an area where a back surface of the light guide plate is the second curved surface portion.

Also, two adjacent surfaces at the back surface side of the light guide plate are connected to each other at an interface portion by an interface curved surface such that makes the two adjacent surfaces tangential.

In addition, reflection dots are formed on the back surface of the light guide plate by means of one of dot printing, frosting finish, hot plating and injection molding in a predetermined shape at a predetermined density.

Additionally, the surface light source device includes an optical sheet composed of a diffusion sheet placed at a light emitting surface side of the light guide plate and a lens sheet having a light collecting property.

Also, the light guide plate forming the surface light source device is provided with minute prisms each having a light collecting property on at least one of the light emitting surface and back surface.

Moreover, the light guide plate forming the surface light source device is applied with a treatment that gives a diffusing function to the light emitting surface.

Further, the light guide plate forming the surface light source device is applied with a treatment that gives a diffusing function to the light emitting surface, and provided with minute prisms each having a light collecting property on the back surface.

Furthermore, a diffusing sheet and a lens sheet having a light collecting property are placed subsidiarily on the light guide plate provided with the prisms or applied with the treatment such that gives the diffusing function.

For a fuller understanding of the nature and advantages of the invention, reference should be made to the ensuing detailed description taken in conjunction with the accompanying drawings.

BRIEF DESCRIPTION OF THE ACCOMPANYING DRAWINGS

DETAILED DESCRIPTION OF THE PREFERRED EMBODIMENTS (Embodiment 1)

Figure 1:
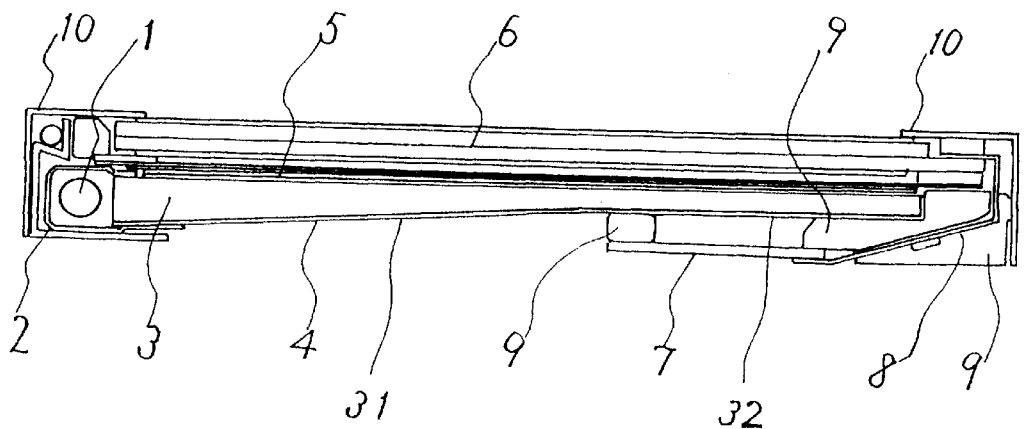
FIG. 1 is a view showing a cross section of a flat-surface type display device employing a transmissive display panel in accordance with Embodiment 1 of the present invention.

The following description will describe a flat-surface type display device in accordance with one embodiment of the present invention. FIG. 1 is a view showing a cross section of a flat-surface type display device in accordance with Embodiment 1 of the present invention employing a transmissive display panel and a surface light source device of an edge light system as a backlight. In the drawing, Numeral 1 denotes a linear light source composed of a cold cathode fluorescent tube or the like; Numeral 2 denotes a reflector that is provided to surround the linear light source 1 so as to reflect light emitted from the linear light source 1 in one direction; Numeral 3 denotes a light guide plate to which the reflector 2 surrounding the linear light source 1 is attached at one edge on the long side and on which light emitted from the linear light source 1 and reflected by the reflector 2 in one direction is incident; Numeral 4 denotes a reflection sheet placed at the back surface side of the light guide plate 3; and Numeral 5 denotes an optical sheet placed at the main surface (light emitting surface) side of the light guide plate 3, and the surface light source device of the edge light system comprises the foregoing members. Also, Numeral 6 denotes a transmissive display panel; Numeral 7 denotes a circuit board; Numeral 8 denotes a TCP composed of an elastic wiring board used in electrically connecting the display panel 6 and circuit board 7 and driving ICs provided thereon; Numeral 9 denotes a mold frame serving as a mechanism portion for retaining the foregoing members at their respective predetermined positions; Numeral 10 denotes a front frame; Numeral 31 denotes an inclined flat surface portion at the back surface side of the light guide plate 3; and Numeral 32 denotes a parallel flat surface portion at the back surface side of the light guide plate 3.

The light guide plate 3 of the surface light source device of the edge light system employed as the backlight of the flat-surface type display device of the present embodiment has a flat light emitting surface, and a back surface arranged so as to include (1) the inclined flat surface portion 31 where the thickness of the light guide plate 3 decreases linearly from a light-incident portion on which light emitted from the linear light source 1 is incident toward a light-anti-incident portion at the opposite side, and (2) the parallel flat surface portion 32 that is parallel with the light emitting surface in the vicinity of the light-anti-incident portion. Also, it is designed such that the inclined flat surface portion 31 and parallel flat surface portion 32 are connected to each other with a curved surface at the interface portion, and the curvature of the interface curved surface is adjusted so that the two flat surfaces are tangential.

Also, by forming reflection dots on the back surface of the light guide plate 3 by means of dot printing, frosting finish, hot plating or injection molding, the surface luminance of the light guide plate 3 is enhanced. Uniformity as good as the one obtained in the conventional arrangement can be achieved by correcting the shape and density of the reflection dots on the curved surface portion and the flat surface portions that are parallel with or inclined with respect to the light emitting surface based on the data designed in accordance with the conventional wedge-shaped light guide plate.

Figure 2A:
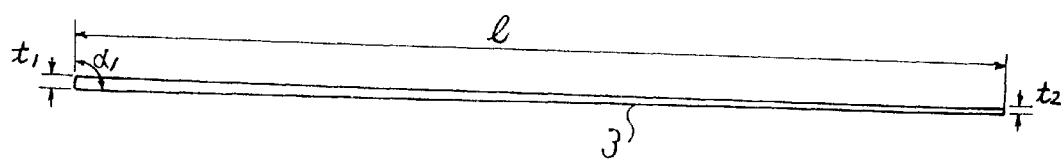
FIGS. 2A and 2B are views explaining an effect achieved by Embodiment 1 of the present invention.
Figure 2B:
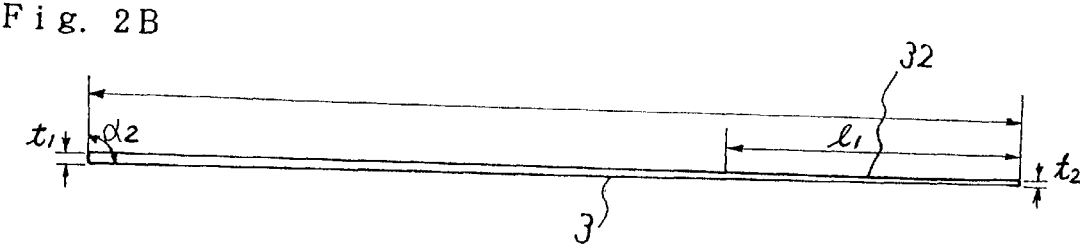

For example, the shape and density of the reflection dots are designed in the following manner. That is, in case of the light guide plate 3 typically employed in the transmissive liquid crystal display device with a 14-inch diagonal screen, the light guide plate 3 is shaped into a wedge having a width (long side) of 290 mm, a length (short side) of 220 mm, and thickness t1 of 2.5 mm at the light-incident portion and t2 of 1 mm at the light-anti-incident portion. In this case, as shown in FIG. 2A, an angle $\alpha 1$ formed between the light-incident surface and the back surface of the light guide plate 3 is 89.6 degrees. In case of the light guide plate 3 of the present embodiment, as shown in FIG. 2B, given 70 mm (⅓ of the entire length) from the light-anti-incident portion as a length of the parallel flat surface portion 32 at the light-anti-incident portion side, then the angle $\alpha 2$ formed between the light-incident surface and the back surface of the light guide plate 3 is 89.43 degrees. Thus, a difference in angle between the conventional arrangement and the present embodiment is approximately 0.2 degree, and one can design the positions of the reflection dots to be formed on the light guide plate 3 with the conventional technique.

In addition, in case that the light guide plate 3 of the present embodiment is employed in the foregoing transmissive liquid crystal display device with a 14-inch diagonal screen, a space of 1.5 mm high can be secured for the essential electric circuit used in driving the display device in an area within 70 mm of the light-anti-incident portion. In comparison, in case that the conventional wedge-shaped light guide plate is employed, a space of 1.5 mm high can be secured in the light-anti-incident portion as well, but only a smaller space of 0.8 mm high is secured at a distance 70 mm from the light-anti-incident portion.

The optical sheet 5 has a structure, in which a lens sheet is sandwiched between diffusion sheets. However, when the luminance needs to be enhanced, more than one lens sheet can be combined in consideration of the direction of prisms formed on their surfaces. Also, when the diffusing property needs to be enhanced, two or more diffusion sheets can be used, and depending on the orientation of the light guide plate 3 and lens sheet, there may be a case where only one diffusion sheet is sufficient, or the diffusion sheet is omitted.

According to the present embodiment, by forming the back surface side of the light guide plate 3 with (1) the inclined flat surface portion 31 where the thickness of the light guide plate 3 decreases linearly from the light-incident portion on which light emitted from the linear light source 1 is incident toward the light-anti-incident portion, and (2) the parallel flat surface portion 32 which is parallel with the light emitting surface in the vicinity of the light-anti-incident portion, and by designing the inclined flat surface portion 31 and parallel flat surface portion 32 so as to be connected to each other with the curved surface at the interface portion, a space of the essential electric circuit for driving the display device can be secured without deteriorating the optical performance of the surface light source device serving as the backlight.

(Embodiment 2)

Figure 3:
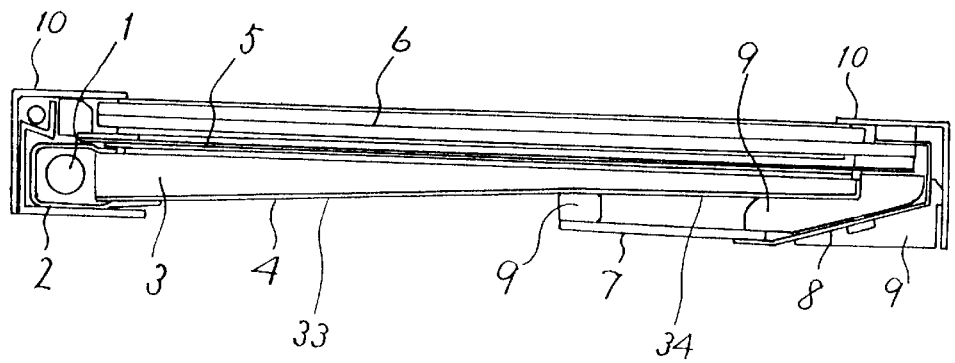
FIG. 3 is a view showing a cross section of a flat-surface type display device employing a transmissive display panel in accordance with Embodiment 2 of the present invention.

FIG. 3 is a view showing a cross section of a flat-surface type display device in accordance with Embodiment 2 of the present invention. In the drawing, Numeral 33 denotes a first inclined flat surface portion at the back surface side of the light guide plate 3, and Numeral 34 denotes a second inclined flat surface portion at the back surface side of the light guide plate 3. The other members are the same as their respective counterparts in Embodiment 1 and labeled with like numerals. The explanation of these members is not repeated for ease of explanation.

The light guide plate 3 of the surface light source device of the edge light system employed as the backlight of the flat-surface type display device of the present embodiment has a flat light emitting surface, and a back surface arranged so as to include (1) the first inclined flat surface portion 33 where the thickness of the light guide plate 3 decreases linearly from a light-incident portion on which light emitted from the linear light source 1 is incident toward a light-anti-incident portion, and (2) the second inclined flat surface portion 34 given with a smaller angle of inclination than that of the first inclined flat surface portion 33 in the vicinity of the light-anti-incident portion. Also, it is designed such that the two inclined flat surface portions are connected to each other with a curved surface at the interface portion, and the curvature of the interface curved surface is adjusted so that the two inclined flat surfaces are tangential.

Also, by forming the reflection dots on the back surface of the light guide plate 3 by means of dot printing or frosting finish, the surface luminance of the light guide plate 3 is enhanced. Uniformity as good as the one obtained in the conventional arrangement can be achieved by correcting the shape and density of the reflection dots on the curved surface portion and the flat surface portions inclined with respect to the light emitting surface based on the data designed in accordance with the conventional wedge-shaped light guide plate.

According to the present embodiment, by forming the back surface side of the light guide plate 3 with (1) the first inclined flat surface portion 33 where the thickness of the light guide plate 3 decreases linearly from the light-incident portion on which light emitted from the linear light source 1 is incident toward the light-anti-incident portion, and (2) the second inclined flat surface portion 34 given with a smaller angle of inclination than that of the first inclined flat surface portion 33 in the vicinity of the light-anti-incident portion, and by designing the two inclined flat surface portions so as to be connected to each other with a curved surface at the interface portion, although a space of the essential electric circuit for driving the display device is slightly limited in height compared with Embodiment 1, the reflection dots that enhance surface luminance of the light guide plate 3 can be designed more readily than in Embodiment 1.

(Embodiment 3)

Figure 4:
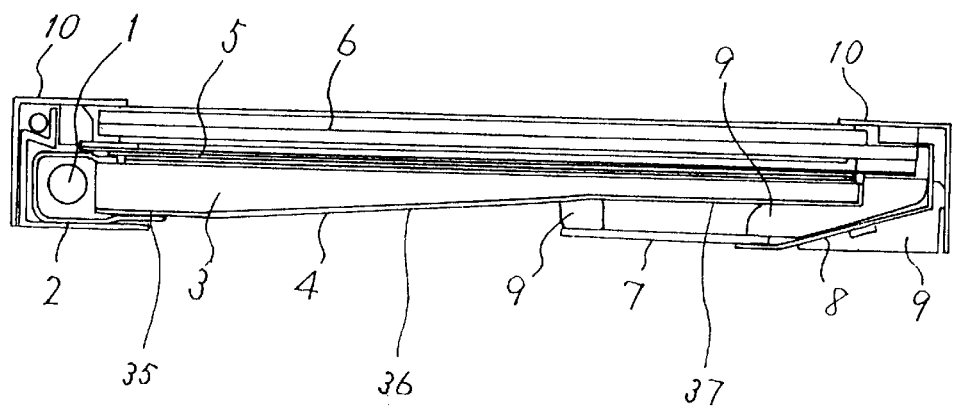
FIG. 4 is a view showing a cross section of a flat-surface type display device employing a transmissive display panel in accordance with Embodiment 3 of the present invention.

FIG. 4 is a view showing a cross section of a flat-surface type display device in accordance with Embodiment 3 of the present invention. In the drawing, Numeral 35 denotes a first parallel flat surface portion at the back surface side of the light guide plate 3; Numeral 36 denotes an inclined flat surface portion at the back surface side of the light guide plate 3; and Numeral 37 denotes a second parallel flat surface portion at the back surface side of the light guide plate 3. The other members are the same as their respective counterparts in Embodiment 1 and labeled with like numerals. The explanation of these members is not repeated for ease of explanation.

The light guide plate 3 of the surface light source device of the edge light system employed as the backlight of the flat-surface type display device of the present embodiment has a flat light emitting surface, and a back surface arranged so as to include (1) the first parallel flat surface portion 35 that is parallel with the light emitting surface in the vicinity of a light-incident portion on which light emitted from the linear light source 1 is incident; (2) the inclined flat surface portion 36, following the first parallel flat surface portion 35, where the thickness of the light guide plate 3 decreases linearly toward a light-anti-incident portion; and (3) the second parallel flat surface portion 37, following the inclined flat surface portion 36, which is parallel with the light emitting surface in the vicinity of the light-anti-incident portion with the thickness of the light guide plate 3 being reduced from that in the first parallel flat surface portion 35. Also, it is designed such that the inclined flat surface portion and each parallel flat surface portion are connected to each other with a curved surface at the interface portion, and the curvature of each interface curved surface is adjusted so that the two flat surfaces are tangential.

Also, by forming the reflection dots on the back surface of the light guide plate 3 by means of dot printing or frosting finish, the surface luminance of the light guide plate 3 is enhanced. Uniformity as good as the one obtained in the conventional arrangement can be achieved by correcting the shape and density of the reflection dots on the curved surface portions and the flat surface portions that are parallel with or inclined with respect to the light emitting surface based on the data designed in accordance with the conventional wedge-shaped light guide plate.

In the present embodiment, the flat surface portion (first parallel flat surface portion 35) parallel with the light emitting surface in the vicinity of the light-incident portion is added to the arrangement at the back surface side of the light guide plate 3 described in Embodiment 1. It should be appreciated, however, that the flat surface portion (first parallel flat surface portion 35) parallel with the light emitting surface in the vicinity of the light-incident portion can be also added to the arrangement at the back surface side of the light guide plate 3 described in Embodiment 2.

According to the present embodiment, by forming the back surface side of the light guide plate 3 with (1) the first parallel flat surface portion 35 that is parallel with the light emitting surface in the vicinity of the light-incident portion on which light emitted from the linear light source 1 is incident; (2) the inclined flat surface portion 36, following the first parallel flat surface portion 35, where the thickness of the light guide plate 3 decreases linearly toward the light-anti-incident portion; and (3) the second parallel flat surface portion 37, following the inclined flat surface portion 36, which is parallel with the light emitting surface in the vicinity of the light-anti-incident portion, and by designing the inclined flat surface portion and each parallel flat surface portion so as to be connected to each other with a curved surface at the interface portion, the same effect as discussed in Embodiment 1 can be achieved. In addition, because incidence efficiency of light emitted from the linear light source 1 and incident on the light guide plate 3 is substantially the same as that of the flat-surface type light guide plate, and the back surface of the light guide plate 3 is formed into the flat surface in the vicinity of the light-incident portion, it is possible to suppress the occurrence of unwanted bright lines caused with the light guide plate having the inclined back surface. The bright lines can be effectively prevented by setting the length of the first parallel flat surface portion 35 on the back surface of the light guide plate 3 in the vicinity of the light-incident portion as great as or greater than the thickness of the light-incident portion of the light guide plate 3, and in practice, it is appropriate that a value about ten times as great as the thickness of the light-incident portion is set.

(Embodiment 4)

Figure 5:
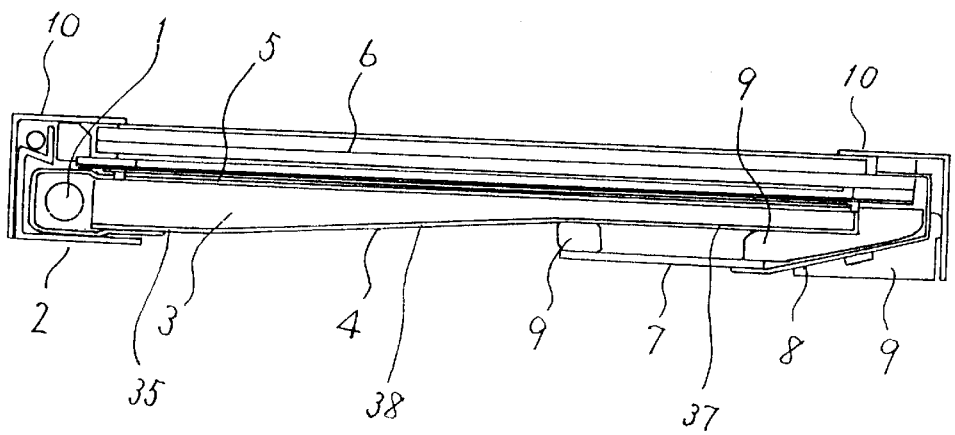
FIG. 5 is a view showing a cross section of a flat-surface type display device employing a transmissive display panel in accordance with Embodiment 4 of the present invention.

FIG. 5 is a view showing a cross section of a flat-surface type display device in accordance with Embodiment 4 of the present invention. In the drawing, Numeral 38 denotes a curved surface portion at the back surface side of the light guide plate 3. The other members are the same as their respective counterparts in Embodiment 3 and labeled with like numerals. The explanation of these members is not repeated for ease of explanation.

The light guide plate 3 of the surface light source device of the edge light system employed as the backlight of the flat-surface type display device of the present embodiment has a flat light emitting surface, and a back surface arranged so as to include (1) the first parallel flat surface portion 35 that is parallel with the light emitting surface in the vicinity of the light-incident portion on which light emitted from the linear light source 1 is incident; (2) the curved surface portion 38, following the first parallel flat surface portion 35, where the thickness of the light guide plate 3 decreases in an at least third-order convex curved line with respect to the light emitting surface toward the light-anti-incident portion; and (3) the second parallel flat surface portion 37, following the curved surface portion 38, which is parallel with the light emitting surface in the vicinity of the light-anti-incident portion with the thickness of the light guide plate 3 being reduced from that in the first parallel flat surface portion 35. Also, it is designed such that each parallel flat surface portion parallel with the light emitting surface and the curved surface portion are connected to each other with a curved surface at the interface portion, and the curvature of each interface curved surface is adjusted so that the flat surface and curved surface are tangential.

Also, by forming the reflection dots on the back surface of the light guide plate 3 by means of dot printing or frosting finish, the surface luminance of the light guide plate 3 is enhanced. Uniformity as good as the one obtained in the conventional arrangement can be achieved by correcting the shape and density of the reflection dots on the curved surface portion and the flat surface portions that are parallel with the light emitting surface based on the data designed in accordance with the conventional wedge-shaped light guide plate.

According to the present embodiment, the same effect as discussed in Embodiment 3 can be achieved.

(Embodiment 5)

Figure 6:
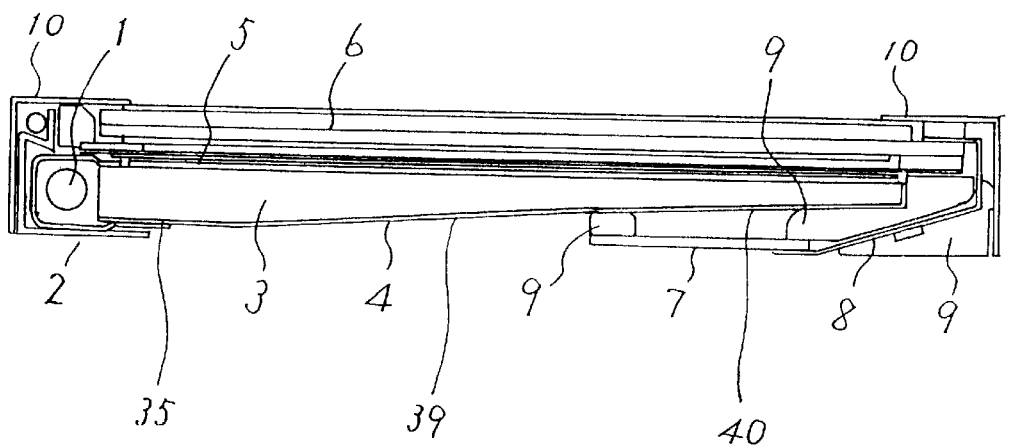
FIG. 6 is a view showing a cross section of a flat-surface type display device employing a transmissive display panel in accordance with Embodiment 5 of the present invention.
Figure 7:
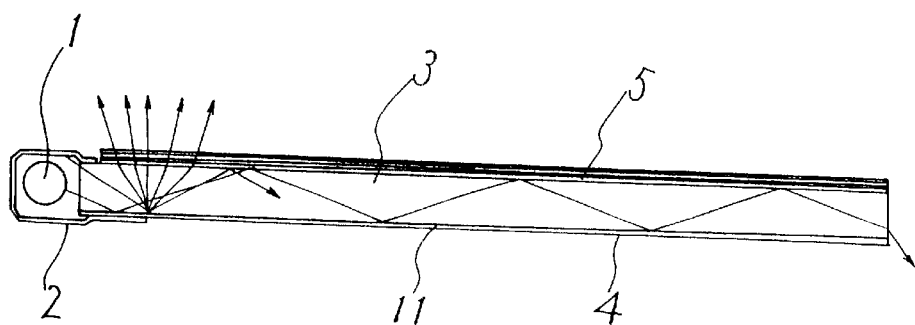
FIG. 7 is a view showing a cross section of a surface light source device of an edge light system employed as a backlight in a conventional flat-surface type display device of the same kind.
Figure 8:
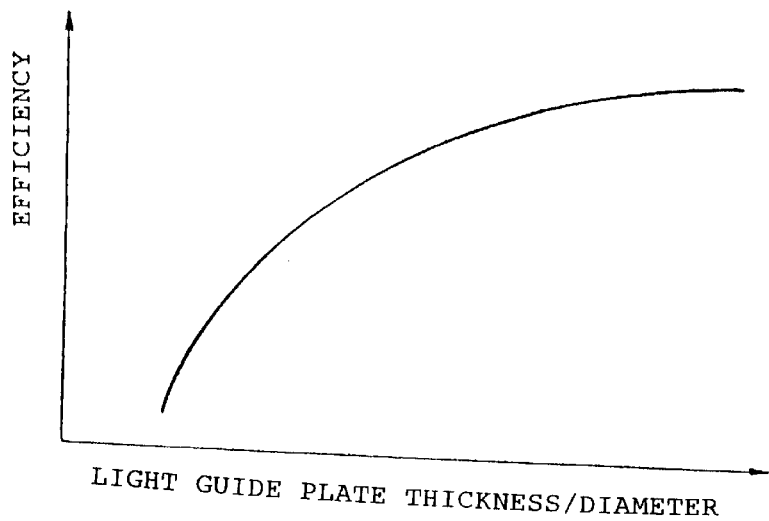
FIG. 8 is a view showing an incidence efficiency of light emitted from a linear light source and incident on a light guide plate with respect to an aperture of the linear light source and a thickness of the light guide plate in the surface light source device of the edge light system.
Figure 9:
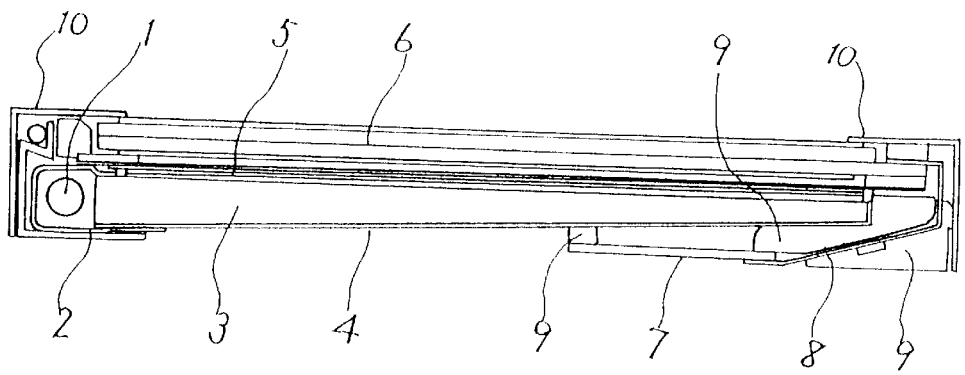
FIG. 9 is a view showing a cross section of a conventional flat-surface type display device employing a transmissive display panel.
Figure 10:
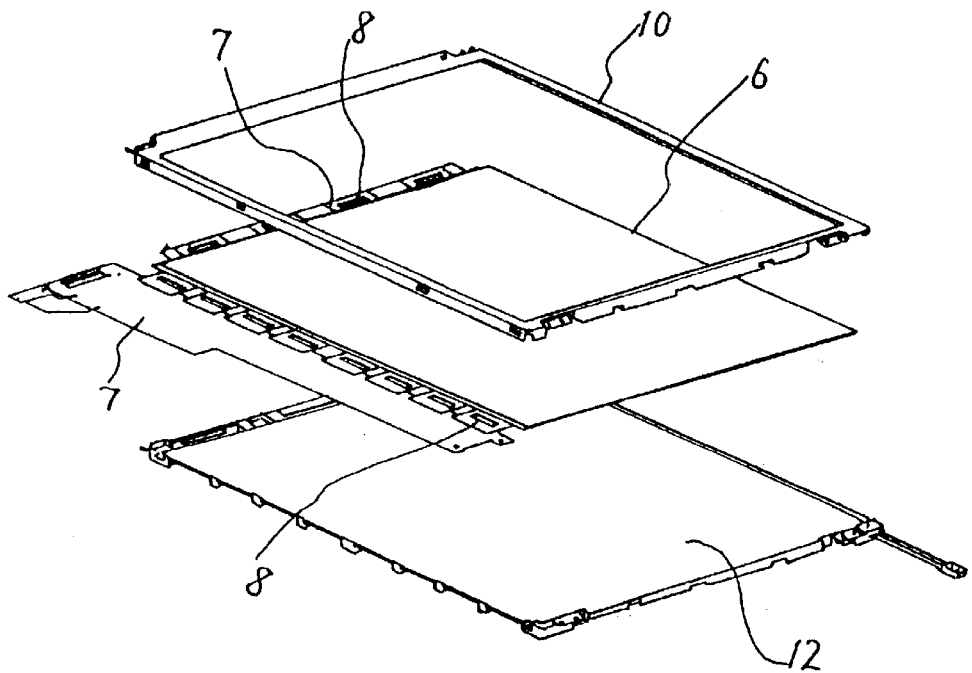
FIG. 10 is a perspective view depicting an arrangement of a conventional flat-surface type display device employing a transmissive display panel.
Figure 11:
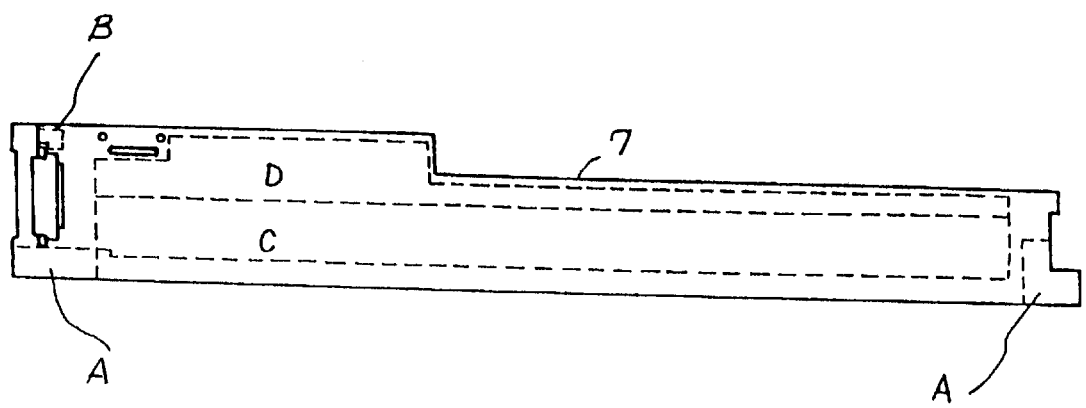
FIG. 11 is a view explaining problems with a conventional flat-surface type display device.

FIG. 6 is a view showing a cross section of a flat-surface type display device in accordance with Embodiment 5 of the present invention. In the drawing, Numeral 39 denotes a first curved surface portion at the back surface side of the light guide plate 3, and Numeral 40 denotes a second curved surface portion at the back surface side of the light guide plate 3. The other members are the same as their respective counterparts in Embodiment 3 and labeled with like numerals. The explanation of these members is not repeated for ease of explanation.

The light guide plate 3 of the surface light source device of the edge light system employed as the backlight of the flat-surface type display device of the present embodiment has a flat light emitting surface, and a back surface arranged so as to include (1) the first parallel flat surface portion 35 that is parallel with the light emitting surface in the vicinity of a light-incident portion on which light emitted from the linear light source 1 is incident; (2) the first curved surface portion 39, following the first parallel flat surface portion 35, where the thickness of the light guide plate 3 decreases in an at least third-order convex curved line with respect to the light emitting surface toward a light-anti-incident portion; and (3) the second curved surface portion 40, following the first curved surface portion 39, given with a smaller rate of change than that of the first curved surface portion 39 in the vicinity of the light-anti-incident portion. Also, it is designed such that the flat surface portion that is parallel with the light emitting surface and the curved surface portion are connected to each other with a curved surface at the interface portion, and the curvature of the interface curved surface is adjusted so that the flat surface and curved surface are tangential.

Also, by forming the reflection dots on the back surface of the light guide plate 3 by means of dot printing or frosting finish, the surface luminance of the light guide plate 3 is enhanced. Uniformity as good as the one obtained in the conventional arrangement can be achieved by correcting the shape and density of the reflection dots on the curved surface portions and the flat surface portion that is parallel with the light emitting surface based on the data designed in accordance with the conventional wedge-shaped light guide plate.

According to the present embodiment, the same effect as discussed in Embodiment 3 can be achieved.

It is also possible to enhance a light collecting function by forming minute prisms at least one of the main and back surface of the light guide plate 3 in any of Embodiments 1 through 5. Also, a diffusing function can be additionally provided by forming minute frosting or applying sand blasting finish on the main surface of the light guide plate 3. Moreover, prisms can be formed on the back surface of the light guide plate 3 concurrently when the diffusing function is additionally provided.

Further, by subsidiarily combining the above-arranged light guide plate with a lens sheet having a light collecting property and a diffusion sheet, both the luminance and uniformity thereof can be enhanced.

As has been discussed above, according to the present invention, with the light guide plate of the surface light source device of the edge light system employed as the backlight of the flat-surface type display device, by arranging the shape at the back surface side (opposing surface side to the light emitting surface) to (1) an inclined surface so that the thickness of the light guide plate decreases from the light-incident portion where light emitted from the linear light source is incident toward the light-anti-incident portion, and (2) an inclined shape parallel or almost parallel with the light emitting surface in the vicinity of the light-anti-incident portion, a space of the essential electric circuit for driving the display device can be secured in the thin flat-surface type display device without deteriorating the optical performance, thereby facilitating the circuit design.

In addition, by providing an area which is parallel with the light emitting surface at the back surface side of the light guide plate in the vicinity of the light-incident portion on which light emitted from the linear light source is incident, incidence efficiency of light that is emitted from the linear light source and incident on the light guide plate can be enhanced.

Also, by connecting the two adjacent surfaces at the interface portion at the back surface side of the light guide plate smoothly by using an interface curved surface such that makes the two adjacent surfaces tangential, and by forming the reflection dots at the back surface side of the light guide plate in a predetermined shape at a predetermined density, deterioration in luminance uniformity can be prevented.

While preferred embodiments of the present invention have been described using specific terms, such description is for illustrative purposes, and it is to be understood that changes and variations may be made without departing from the spirit or scope of the following claims.

What is claimed is:

1. A flat-surface type display device, comprising:
   a display panel of a light transmissive type;
   a surface light source device of an edge light system for emitting light to said display panel from behind;
   a circuit board, connected to said display panel through a wiring board, for supplying said display panel with a signal necessary to drive said display panel; and
   a mechanical portion for housing and retaining said display panel, said surface light source device, and said circuit board, wherein said surface light source device includes a light guide plate having a flat light emitting surface, and a back surface opposing to said light emitting surface, and said light guide plate has a light-incident end on which light emitted from a light source and a light-anti-incident end remote from said light-incident end, said back surface includes (1) an inclined flat surface portion disposed in an area near said light-incident end, where the thickness of said light guide plate under said inclined flat surface portion decreases linearly from the end near to said light-incident end toward the end remote from said light-incident end and (2) a parallel flat surface portion, following said inclined flat surface portion, disposed in an area near said light-anti-incident end, which is substantially parallel with said flat light emitting surface where the thickness of said light guide plate under said parallel flat surface portion is reduced from said light-incident end, and said circuit board is disposed in a position opposing to said parallel flat surface portion.

2. The flat-surface type display device according to claim 1, wherein said back surface further includes (3) an additional parallel flat surface portion disposed in an area between said light-incident end and said inclined flat surface portion, said additional parallel flat surface portion is substantially parallel with said flat light emitting surface.

3. The flat-surface type display device according to claim 1, wherein reflection dots are formed on the back surface of said light guide plate by means of one of dot printing, frosting finish, hot plating and injection molding in a predetermined shape at a predetermined density.

4. The flat-surface type display device according to claim 1, wherein said surface light source device includes an optical sheet composed of a diffusion sheet placed at a light emitting surface side of said light guide plate and a lens sheet having a light collecting property.

5. The flat-surface type display device according to claim 1, wherein said light guide plate forming said surface light source device is provided with minute prisms each having a light collecting property on at least one of said light emitting surface and back surface.

6. The flat-surface type display device according to claim 1, wherein said light guide plate forming said surface light source device is applied with a treatment that gives a diffusing function to said light emitting surface.

7. The flat-surface type display device according to claim 1, wherein said light guide plate forming said surface light source device is applied with a treatment that gives a diffusing function to said light emitting surface, and provided with minute prisms each having a light collecting property on said back surface.

8. The flat-surface type display device according to claim 5, wherein a diffusing sheet and a lens sheet having a light collecting property are placed subsidiarily on said light guide plate provided with the prisms or applied with the treatment that gives the diffusing function.

9. The flat-surface type display device according to claim 1, wherein said inclined flat surface portion and said parallel flat surface portion at the back surface of said light guide plate are connected to each other at an interface portion by an interface curved surface such that makes said inclined flat surface portion and said parallel flat surface portion tangential.

10. A flat-surface type display device, comprising:
a display panel of a light transmissive type;
a surface light source device of an edge light system for emitting light to said display panel from behind;
a circuit board, connected to said display panel through a wiring board, for supplying said display panel with a signal necessary to drive said display panel; and
a mechanical portion for housing and retaining said display panel, said surface light source device, and said circuit board,
wherein said surface light source device includes a light guide plate having a flat light emitting surface and a back surface opposing to said light emitting surface, and
and said light guide plate has a light-incident end on which light emitted from a light source and a light-anti-incident end remote from said light-incident end, said back surface includes (1) a first inclined flat surface portion disposed in an area near said light-incident end, where the thickness of said light guide plate under said first inclined flat surface portion decreases linearly from the end near to said light-incident end toward the end remote from said light-incident end, and (2) a second inclined flat surface portion, following said first inclined flat surface portion, disposed in an area near to said light-anti-incident end, which has a smaller angle of inclination than the angle of inclination of said first inclined flat surface portion and the thickness of said light guide plate under said second inclined flat surface portion decreases linearly from the end near to said light-incident end toward the end near to said light-anti-incident end, and,
said circuit board is disposed in a position opposing to said second inclined flat surface portion.

11. The flat-surface type display device according to claim 10, wherein said back surface further includes an additional parallel flat surface portion disposed in an area between said light-incident end and said first inclined flat surface portion, said additional parallel flat surface portion is substantially parallel with said flat light emitting surface.

12. The flat-surface type display device according to claimed 10, wherein said first inclined flat surface portion and said second inclined flat surface portion at said back surface of said light guide plate are connected to each other at an interface portion by an interface curved surface such that makes said first inclined flat surface portion and said second inclined flat surface portion tangential.

13. A flat-surface type display device, comprising:
a display panel of a light transmissive type;
a surface light source device of an edge light system for emitting light to said display panel;
a circuit board, connected to said display panel through a wiring board, for supplying said display panel with a signal necessary to drive said display panel; and
a mechanical portion for housing and retaining said display panel, said surface light source device, and said circuit board,
wherein said surface light source device includes a light guide plate having a flat light emitting surface, and a back surface opposing to said light emitting surface, and
said light guide plate has a light-incident end remote from said light-incident end,
said back surface includes (1) a first flat surface portion disposed in an area near said light-incident end, which is substantially parallel with said flat light emitting surface, (2) a curved surface portion following said first flat surface portion, where the thickness of said light guide plate under said curved surface portion decreases in an at least third-order curved line from the end near to said first flat surface portion toward the end remote from said first flat surface portion and (3) a second flat surface portion disposed in an area near said light-anti-incident end, following said curved surface portion, which is substantially parallel with said flat light emitting surface and said circuit board is disposed in a position opposing to said second flat surface portion.

14. The flat-surface type display device according to claim 13, wherein said first flat surface portion, said curved surface portion and said second flat surface portion at said back surface of said light guide plate are connected to each others at interface portions by interface curved surfaces such that make said first flat surface portion, said curved surface portion and said second flat surface portion tangential.

15. A flat-surface type display device, comprising:
  a display device of a light transmissive type;
  a surface light source device of an edge light system for emitting light to said display panel;
  a circuit board, connected to said display panel through a wiring board, for supplying said display panel with a signal necessary to drive said display panel; and
  a mechanical portion for housing and retaining said display panel, said surface light source device, and said circuit board,
    wherein said surface light source device includes a light guide plate having a flat light emitting surface, and a back surface opposing to said light emitting surface and arranged so as to include (1) a flat surface portion parallel with said light emitting surface, and said light guide plate has a light-incident end on which light emitted from a light source and a light-anti-incident end remote from said light-incident end,
    said back surface includes (1) a flat surface portion disposed in an area near said light-incident end, which is substantially parallel with said flat light emitting surface, (2) a first curved surface portion with a first rate of change of curve, following said first flat surface portion, where the thickness of said light guide plate under said first curved surface portion decreases from the end near to said flat surface portion toward the end remote from said flat surface portion and (3) a second curved surface portion with a second rate of change of curve, disposed in an area near said light-anti-incident end, following said first curved surface portion, said second rate of change of curve is smaller than said first rate of change of curve, where the thickness of said light guide plate under said second curved surface portion decreases from the end near to said first curved surface portion toward the end near to said light-anti-incident end, and said circuit board is disposed in a position opposing to said second curved surface portion.

16. The flat-surface type display device according to claim 15, wherein said flat surface portion, said first curved surface portion and said second curved surface portion at said back surface of said light guide plate are connected to each others at interface portions by interface curved surfaces such that make said flat surface portion, said first curved surface portion and said second curved surface portion tangential.

* * * * *